US012633682B2

(12) United States Patent

Buchanan et al.

(10) Patent No.: US 12,633,682 B2
(45) Date of Patent: May 19, 2026

(54) CABLE TERMINATION AND METHOD

(71) Applicant: SIEMENS ENERGY GLOBAL GMBH & CO. KG, Munich (DE)

(72) Inventors: Jordan Buchanan, Ulverston (GB); Christopher Burrow, Ulverston (GB); Daniel Walton, Carnforth (GB)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 710 days.

(21) Appl. No.: 18/022,292

(22) PCT Filed: Aug. 23, 2021

(86) PCT No.: PCT/EP2021/073248

§ 371 (c)(1),
(2) Date: Feb. 21, 2023

(87) PCT Pub. No.: WO2022/043250

PCT Pub. Date: Mar. 3, 2022

(65) Prior Publication Data

US 2023/0344153 A1 Oct. 26, 2023

(30) Foreign Application Priority Data

Aug. 27, 2020 (GB) ...................................... 2013422

(51) Int. Cl.
*H01R 4/20* (2006.01)
*H01R 13/17* (2006.01)
(Continued)

(52) U.S. Cl.
CPC ............... *H01R 4/20* (2013.01); *H01R 13/17* (2013.01); *H01R 13/523* (2013.01); *H01R 13/59* (2013.01); *H01R 2101/00* (2013.01)

(58) Field of Classification Search
CPC ........ H01R 4/20; H01R 13/17; H01R 13/523; H01R 13/59; H01R 2101/00
See application file for complete search history.

(56) References Cited

U.S. PATENT DOCUMENTS 4,468,083 A * 8/1984 Lee .......................... H01R 4/20 439/825
5,015,195 A * 5/1991 Piriz .................... H01R 43/002 439/948
(Continued)

FOREIGN PATENT DOCUMENTS

EP 2779313 A1 9/2014
FR 3067865 A1 12/2018
(Continued)

OTHER PUBLICATIONS

PCT International Search Report and Written Opinion of the International Searching Authority mailed Dec. 9, 2021 corresponding to PCT Application No. PCT/EP2021/073248 filed Aug. 23, 2021.

*Primary Examiner* — Travis S Chambers

(57) ABSTRACT

A subsea connector cable termination system for terminating a cable comprises a cable core (12) and a cable sheath (11). The termination system comprises a crimp component, the crimp component comprising a crimp body and further comprising two or more integral conductive resilient members (14) adapted to be mounted radially outwardly of the cable core. The termination system further comprises a retainer (18) or one of the crimp body, or the conductive resilient members, are adapted to latch the crimp body. A method of terminating a cable to a connector in a subsea cable connection system is also provided.

10 Claims, 6 Drawing Sheets

(51) Int. Cl.

| | |
|---|---|
| ***H01R 13/523*** | (2006.01) |
| ***H01R 13/59*** | (2006.01) |
| *H01R 101/00* | (2006.01) |

(56) References Cited

U.S. PATENT DOCUMENTS

| | | | | |
|---|---|---|---|---|
| 5,362,251 | A * | 11/1994 | Bielak .................... | H01R 9/053 439/394 |
| 2014/0141658 | A1* | 5/2014 | Bazenas ................. | H01R 4/183 439/730 |
| 2015/0155650 | A1* | 6/2015 | Larssen ................... | H01R 11/11 439/271 |
| 2024/0322475 | A1* | 9/2024 | Hamada ................. | H01R 13/17 |

FOREIGN PATENT DOCUMENTS

| | | | |
|---|---|---|---|
| GB | 2566063 | A | 3/2019 |
| WO | 2017133950 | A1 | 8/2017 |

* cited by examiner

CABLE TERMINATION AND METHOD

This invention relates to a cable termination, in particular a termination for a subsea cable and a method of terminating a cable.

Subsea, or underwater, connectors are designed to operate beneath the surface of the water. Typically, a subsea connector comprises two parts, generally known as plug and receptacle. The receptacle may include one or more conductor pins and the plug may include corresponding plug sockets for the receptacle conductor pins. The connection may be made topside (dry-mate), or subsea (wet-mate) and the specific design is adapted according to whether the connector is a wet-mate or dry-mate connector. Subsea connectors have various applications including power connectors which supply power to subsea equipment, or control and instrumentation connectors which exchange data between different pieces of subsea equipment, or between subsea equipment and topside devices.

In subsea connectors one of the critical regions is the termination of the subsea cable to the connector in a cable gland. To ensure a reliable connection to the cable, it is important that the cable is held in place correctly and with minimal electrical resistance. Furthermore, it is important that any external pulling or twisting forces acting on the cable cannot cause the cable to move, or to be pulled out of the gland.

Difficulties with clamping the cable result from the general construction of the cables. Cables often comprise a core, typically a metal, such as copper, with several layers of rubber, plastic and metal to form the cable insulation, earth screen and protective outer jacket. The core must be fitted to the connector in the cable gland such that there is both an effective electrical connection to allow proper operation of the cable and an effective mechanical connection to prevent the cable parting from the connector. For controls and instrumentation type connectors, this typically involves soldering the cable core to the connector, meaning that manufacturing the connections is a skilled and time-consuming operation. Soldered joints are difficult to make within the confines of the backends of control connectors because the interface is densely packed and deeply recessed. Cables add obstruction and clutter and joint making requires considerable operator skill to attain quality and repeatability. It is also desirable that the joint produced can be recycled and achieving this is another highly skilled task. Furthermore, there are health and safety concerns associated with manufacturing soldered joints and problems with contamination due to the flux removal process.

However, further improvements are desirable.

In accordance with a first aspect of the present invention, a subsea connector cable termination system for terminating a cable comprising a cable core and a cable sheath; the termination system comprising a crimp component, the crimp component comprising a crimp body and further comprising two or more integral conductive resilient members adapted to be mounted radially outwardly of the cable core wherein the termination system further comprises a retainer, or wherein one of the crimp body, or the conductive resilient members, are adapted to latch the crimp body to a housing.

The resilient members make electrical contact with the crimp body and are retained, when installed, by the housing maintaining the electrical contact.

A subsea connector cable termination system for terminating a cable may comprise a cable core and a cable sheath; the termination system comprising a sleeve, the sleeve further comprising two or more integral conductive resilient members adapted to be mounted radially outwardly of the cable core wherein the termination system further comprises a retainer, or wherein the conductive resilient members, are adapted to latch the sleeve to a housing.

For data connectors, which may use optical fibres, rather than electrical conductors, a sleeve fitted outside the optical fibre cable core is used, rather than a crimp.

The crimp component may comprise a conductive crimp component or the sleeve comprises a cylindrical sleeve, in particular for an optical fibre.

The conductive crimp component, or the cylindrical sleeve mounted to an optical fibre, may comprise a threaded outer surface.

The threaded outer surface of the conductive crimp component or the cylindrical sleeve mounted to the optical fibre may be axially offset with respect to an external thread of the retainer.

The cable core may comprise one of an electrical conductor, or a data transmission medium.

The electrical conductor or data transmission medium may comprise one of a copper core, stranded wires, twisted pair wires, a waveguide, or an optical fibre.

The retainer may comprise a threaded inner surface.

The conductive resilient member may comprise a leaf spring.

The retainer may further comprise an external thread.

The system may further comprise the housing, wherein the housing comprises an internal thread, corresponding to the threaded outer surface.

In accordance with a second aspect of the present invention, a method of terminating a cable to a connector in a subsea cable connection system comprises exposing a section of cable core at one end of the cable by removing a section of insulation; fitting a crimp component or sleeve around the circumference of the cable core; crimping the crimp component to the cable core or fixing the sleeve around the cable core; fitting a conductive leaf spring to a groove in a first section of the crimp component remote from the cable sleeve, or in the sleeve; applying a retainer to the crimp body in a second section adjacent to the cable sleeve, or providing a latch in the crimp body, in the sleeve, or in the conductive resilient members; and fitting a housing over the first section in contact with the retainer, or latch.

The crimp component is the means by which the cable core is attached to a connector conductor, providing both mechanical and electrical joints to cable, when the cable comprises an electrically conductor core, such as a metal. The latch in the crimp body, or conductive resilient members, latches into back of connector, without the need for a separate retainer to be applied.

A method of terminating a cable to a connector in a subsea cable connection system may comprise exposing a section of cable core at one end of the cable; fitting a crimp component around the circumference of the cable core; crimping the crimp component to the cable core; wherein the crimp component comprises a conductive resilient member, in particular, one or more integral conductive leaf springs; wherein the leaf springs provide electrical contact and latch the crimp component to a housing circumferentially outward of the crimp.

The retainer may comprise an external thread and the housing comprises a corresponding internal thread.

An example of a cable termination and associated method in accordance with the present invention will now be described with reference to the accompanying drawings in which:

FIG. 1 illustrates an example of a known solderless joint;

FIGS. 2*a* to 2*e* illustrate steps in assembling an example of a solderless termination according to the present invention;

For subsea applications, it is important that a reliable electrical connection is made between the cable and the connector in the cable gland, so that the connector is able to withstand the forces applied due to the water pressure at depth, or rough handling during installation or maintenance, whilst facilitating low electrical resistance. Various different approaches have been proposed. GB2566063 describes a solderless joint in which a wire or conductor is held in place on a conical body by a retainer. Further improvements are desirable. The present invention provides a number of embodiments which simplify both the structure of the connector and the assembly process.

Figure 1:
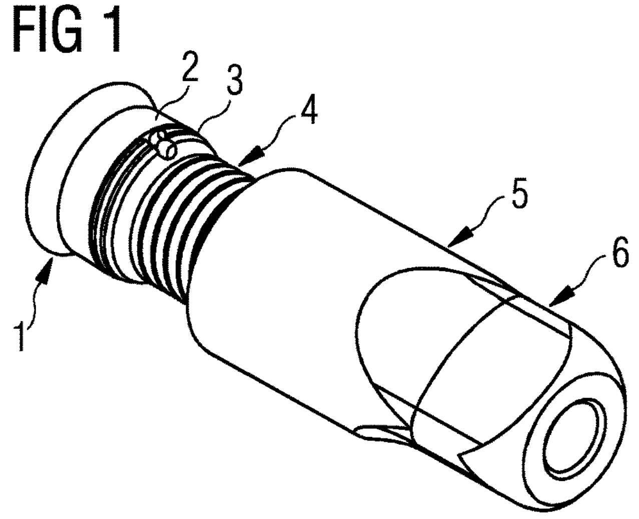

FIG. 1 illustrates a cable connection system as described in GB2566063. This system avoids the use of a crimp by providing a retainer 5 that screws onto a corresponding screw thread 4 on a cylindrical section 1 of a pin 2 and a conical body (not shown) in contact with which a core or wire may be held when the retainer is screwed onto the cylindrical section. Axial movement of the cable within the connection is prevented by means of an end stop. A locking mechanism 3 is fitted to a groove (not shown) in the cylindrical section.

There are many ways of joining a cable to a connector in the cable gland, for example, clamping, soldering, conductive glue, or shrink fitting. The present invention uses crimping to reduce complexity and avoid the need for heating or similar treatment. FIGS. 2*a* to 2*e* illustrate the components of an example of a cable termination according to the present invention and how they are assembled. In the figures, only an outline may be given for some components, for clarity. A cable 10 comprises a sleeve 11, which typically includes electrical insulation layers as well as providing protection against external damage, and a cable core, for example an optical fibre, or a conductor 12, typically a metal, such as copper. The conductor may be a solid conductor, or a stranded wire. A length of the conductor is shown exposed from the sleeve ready for termination. Outlines of a crimp component 13 and leaf spring contact technology 14 can also be seen. For an optical fibre, the crimp component may be replaced by a cylindrical sleeve and attached to the optical fibre with a suitable adhesive. However, the more detailed examples that follow relate to the crimp component.

Figure 2A:
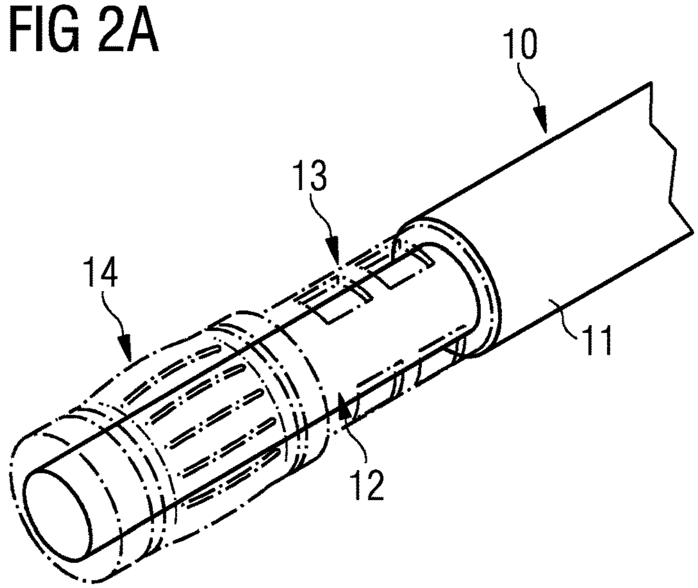
Figure 2B:
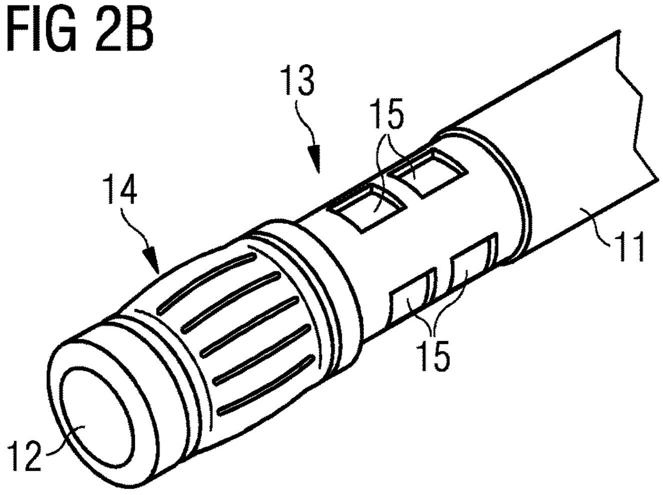

FIG. 2*b* shows more detail of the crimp component and leaf spring. The crimp component 13 has multiple indents 15 forming a crimped profile. The example shows an eight-indent profile, but other formats maybe chosen. The leaf spring contact 14 is housed within a groove (not shown) in the crimp component 13, in the section of the crimp component mounted toward the end of the exposed conductor that is remote from the sleeve 11. The conductor or stranded cable section 12 is fed through the centre of the crimp component 13 as shown.

Figure 2C:
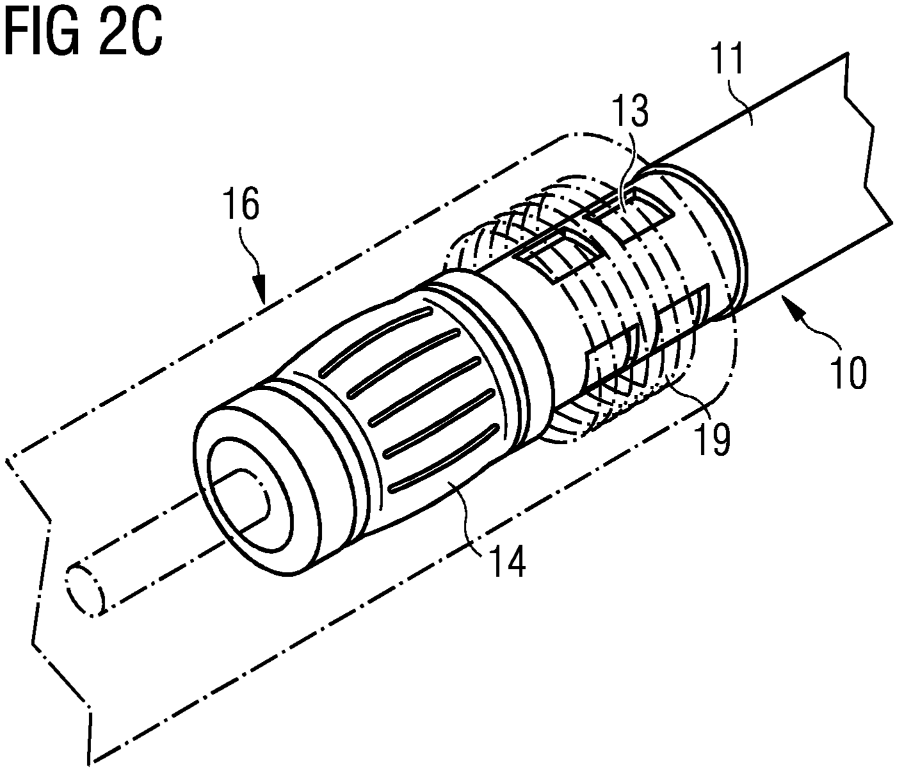
Figure 2D:
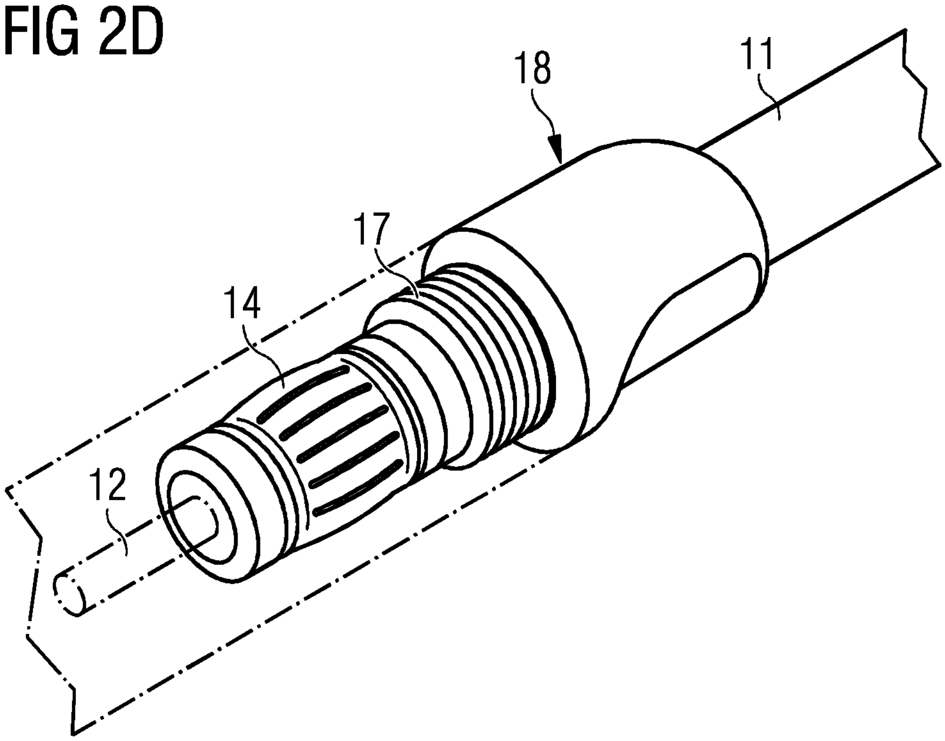

From FIG. 2*c*, it can be seen that the crimp assembly 13 is inserted into a terminating end 16 of a spring housing component 19 (illustrated in outline). Contact is made between the spring housing and crimp 13 via the leaf spring contact technology 14. The internal profile is common across both power and data terminations. FIG. 2*d* shows how the crimp assembly 13 is retained by a threaded component 17, 18. By positioning the leaf spring electrical contact at the base of the crimp component, the crimped area can be covered by the threaded component, thereby reducing the length of the overall termination assembly. A fine threaded screw fastens the components together and optimises space within the termination area. There is no gap between the mating faces of the threaded component 17, 18 and terminating end of the spring housing. When using an optical fibre core, the mount may be provided with an external threaded surface corresponding to the internal screw thread of the retainer 18.

Figure 2E:
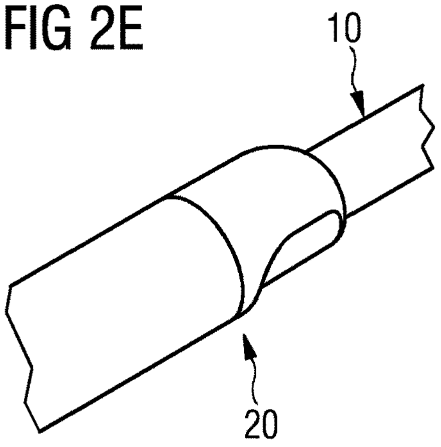

FIG. 2*e* shows the assembled termination 20. A trilobe profile may be adopted to assist the tightening and untightening of the threaded component. The profile provides bend relief for the cable and creates a smooth outer surface to install a terminating sleeve. The crimped profile, or mount, is hidden underneath the retaining screw so its irregular surface profile (normally parked underneath the termination sleeve) does not induce partial discharges and low inception voltages. The external threaded surface 17 of the retainer has a screw thread corresponding to the internal screw thread of the housing 20 of the assembled termination.

There are a number of benefits and advantages provided by the design of the present invention. The crimp component may be removed if required, without causing any damage to the internals of the spring housing, grenade and overall connector. The design is relatively simple compared to existing terminations, so there are time and cost savings, as far less preparation work is required. The assembled termination is compact and uses the minimal space, as well as the shape helping to avoid partial discharge or low inception voltages.

The threaded design allows the crimp component to be removed from the termination area of the spring housing at any time. The terminating operation is relatively quick and straightforward compared to either soldering or other types of solderless terminations, saving time and costs.

Figure 3:
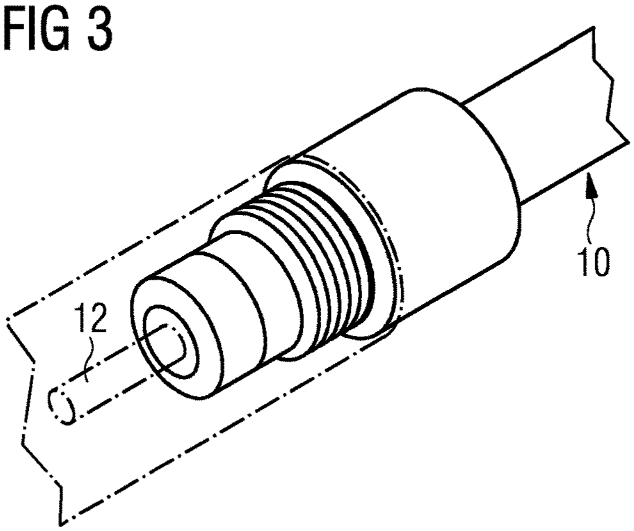
FIG. 3 illustrates a first alternative example of a solderless termination according to the present invention.

A number of alterative embodiments of a cable termination are illustrated in FIGS. 3 to 6 and 9. In FIG. 3, the electrical connection is made through direct contact between conical faces of a crimp component and an internal terminating profile within the spring housing. Retention of the crimp is by means of a threaded component which also provides a constant pressure against the shoulder of the crimp to maintain electrical contact.

Figure 4:
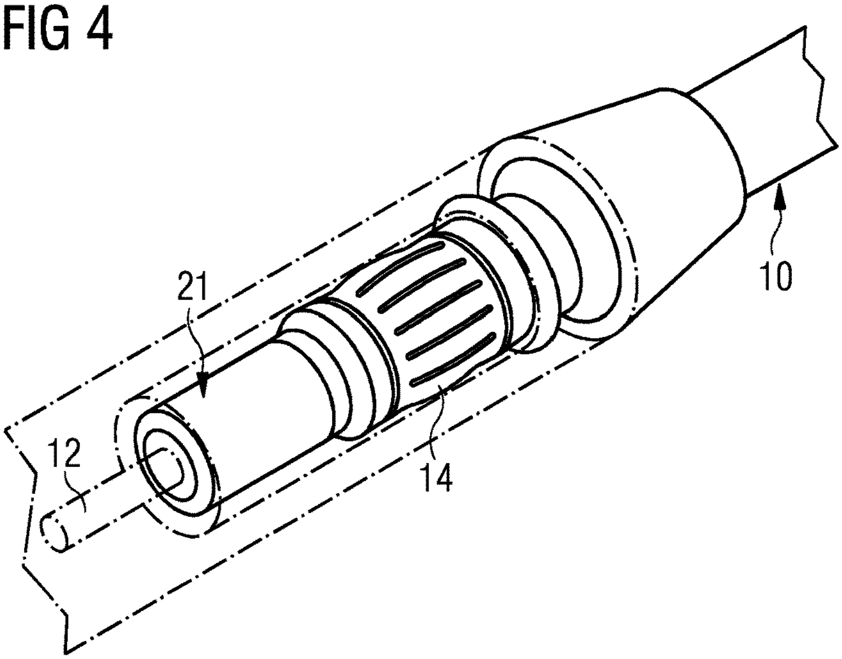
FIG. 4 illustrates a second alternative example of a solderless termination according to the present invention.

In FIG. 4, retention of the crimp is by means of an internal retaining ring. The ring compresses on entry and springs back to its original state when located in a groove with the terminating area. The electrical connection between the crimp and spring housing is made with a leaf spring contact 14 as shown. In this illustration, a hexagonal crimp profile 21 is shown.

Figure 5:
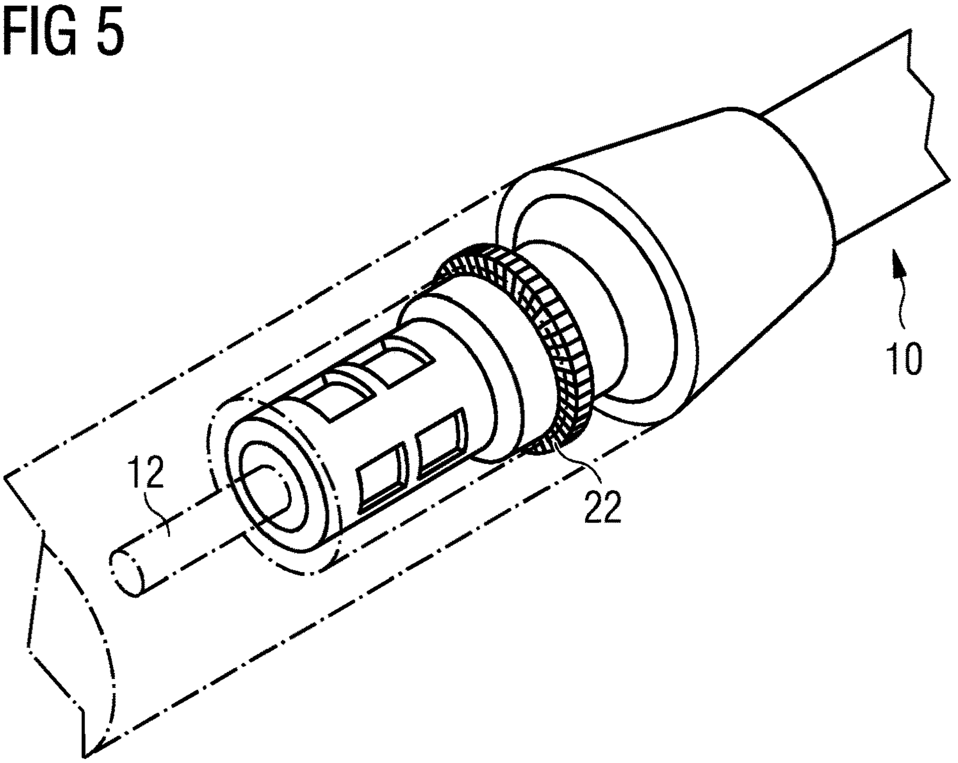
FIG. 5 illustrates a third alternative example of a solderless termination according to the present invention; and, FIG. 6 illustrates a fourth alternative example of a solderless termination according to the present invention.
Figure 6:
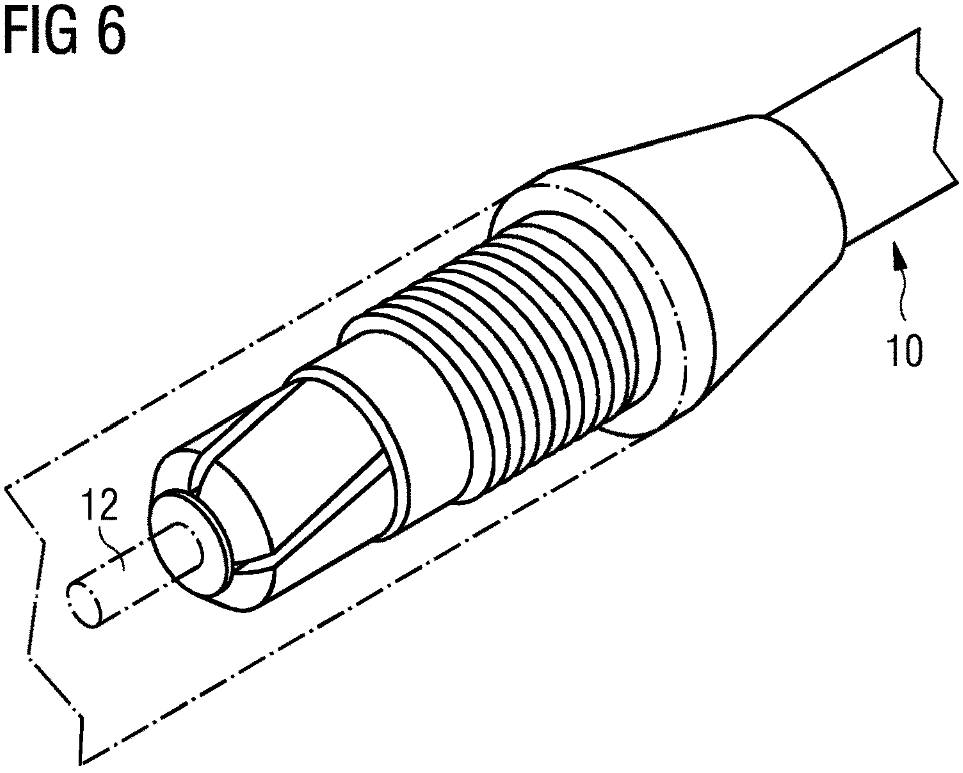

In FIG. 5, the electrical connection between the crimp and spring housing may be made by a canted coil spring 22 as shown. The canted coil spring also provides mechanical retention through spring design and groove geometry. This alternative solution removes the requirement to crimp as well as providing a solderless termination. A hexagonal crimp profile and eight indent crimp profile are shown In FIG. 6, the offset angles between the collet end and internal profile faces force the collet to compress as the threaded component is tightened, thereby biting into the stranded cable. The direct contact provides an electrical connection with the conductor 12 of the cable 10, whilst the screw provides mechanical retention.

Figure 7:
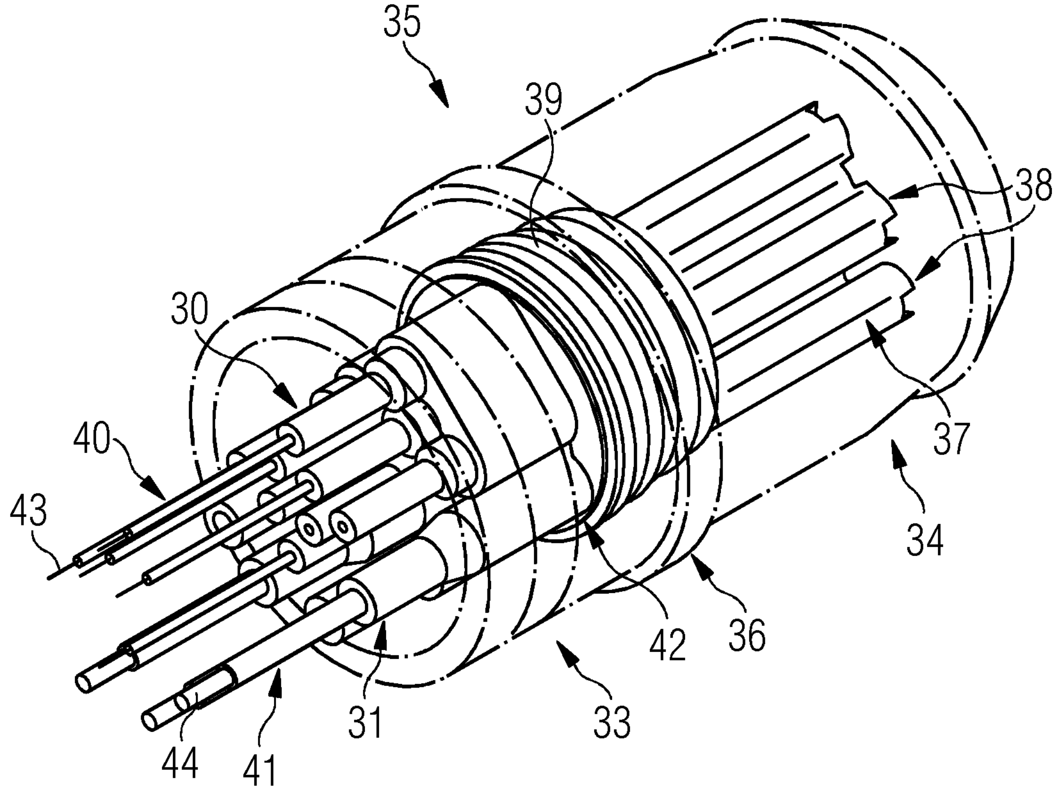
FIG. 7 illustrates a plug connector part, in which the solderless terminations of the present invention may be incorporated.

The present invention is particularly applicable for subsea electrical connectors, for example data and power, or separate data or power connectors. An electrical connector comprises a plug part and a receptacle part. The back end of each of these may be formed with a universal back end, so that cable connections into a plug, or cable connections into a receptacle, use the same crimp element. FIG. 7 illustrates a plug connector part, in which the solderless terminations of the present invention may be incorporated. In the example of FIG. 7, a plug connector part 35 is provided, comprising a plug body 36 in which a plug front end 34 and a plug back end 33 are fitted. The plug front end 34 may comprise a polyaryletheretherketone (PEEK) front end body 37, in which openings are formed to receive a shuttle pin and spring arrangement (not shown). A corresponding receptacle connector part (not shown) comprises a receptacle body having a receptacle front end in which receptacle pins are formed and a receptacle back end having the same format as the plug back end 33.

The shuttle pin in the plug front end moves in response to receptacle pins (not shown) entering the openings 38 at the end of the plug front end 34, remote from the plug back end 33, as the plug part 35 and receptacle part (not shown) are connected. Seals 39, for example, O-ring seals, between an outer diameter of the plug front end and an inner diameter of the plug body housing 36, seal against water ingress onto the data cables 40 and/or power cables 41 in the plug back end. A fixing, such as a circlip 42 between the plug front end 34 and plug back end 33, may be used to hold the back end and front end in place within the plug body 36. A similar fixing may be used on the equivalent part of the receptacle.

Figure 8:
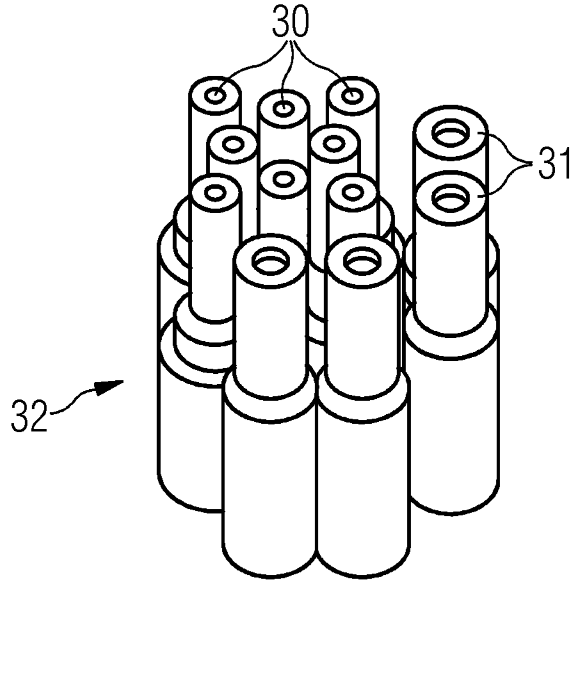
FIG. 8 illustrates more detail of a plug or receptacle back end in which a solderless termination according to the present invention may be used.

FIG. 8 illustrates more detail of a plug or receptacle back end 33 in which any of the solderless terminations according to the present invention may be used. In the example of FIG. 8, the different diameter openings 30, 31 in back end body 32, into which cable conductors may be inserted (for either of the plug back end, or receptacle back end) can be seen. In the example shown, the connector combines both data and power conductors in the same body 32. Data conductors 43, whether optical fibre, or electrical, i.e., metal conductor cores, typically have a smaller diameter than power conductors 44, so that the opening 30 in the back end body 32 is smaller for the data cables than for power cables. Each conductor of each cable is provided with a crimp component, or in the case of optical fibre data cables, a sleeve by which a conductor core, stripped of its insulation, makes electrical contact in the plug connector body, through the shuttle pins, with the receptacle pins of the receptacle connector part, when both plug and receptacle connector parts are connected together.

Figure 9:
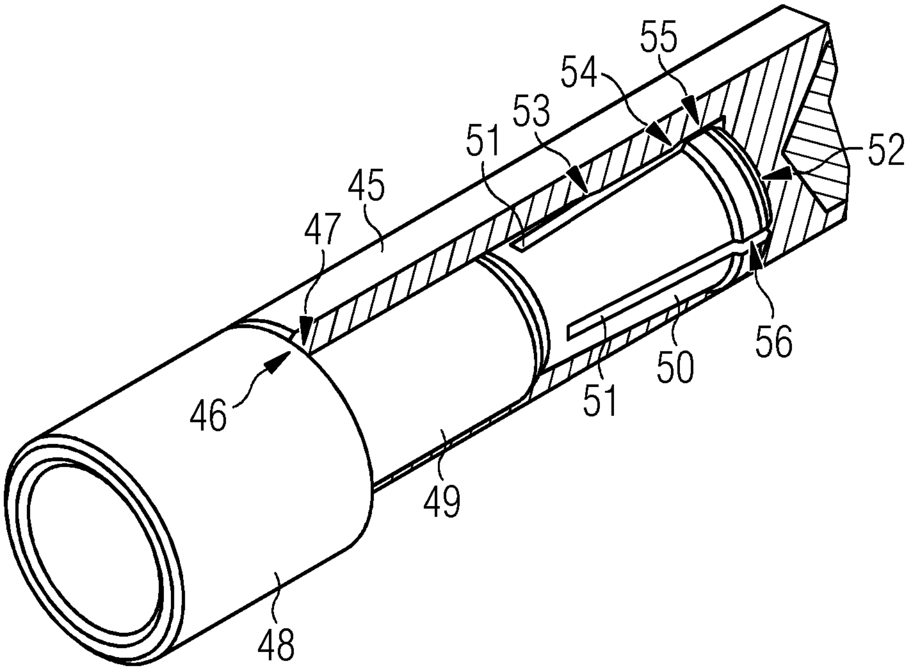
FIG. 9 illustrates part of a fifth alternative example of a solderless termination according to the present invention; and, FIG. 10 is a section through a plug or receptacle back end in which a solderless termination according to the present invention may be used.

FIG. 9 illustrates part of a fifth alternative example of a solderless termination according to the present invention. FIG. 9 illustrates a further embodiment of the present invention. In this embodiment, the retainer is an integral part of the crimp component and is adapted to cooperate with a corresponding part of the housing and latch the crimp component to the housing. An electrically conducting liner sleeve 45 that fits into the openings 30, 31 in the back end engages with a shoulder 46 on an outer barrel section 48 of the crimp component, at an interface 47. The crimp barrel 48 is in contact with the cable insulation and a crimp section 49 is provided, whereby the conductor core 12, 43, 44 of the cable is held in place. An engagement section 50 completes the crimp component, whereby the cable is held in the back end by virtue of the interaction of the engagement section with the back end liner sleeve 45.

As can be seen in FIG. 9, the engagement section further comprises at least two conductive resilient members 51 on its outer surface. The members are fixed at the innermost end of the crimp component and free to move at their free ends. The cable is omitted in FIG. 9 for clarity, but is present, as can be better understood with reference to FIG. 10. Assembly of the connector termination involves stripping back the insulation sleeve 11 from the cable core 12, 43, 44 to expose the core, then applying the crimp component, so that the mid-section 49 is over the exposed core. With a crimping tool, the mid-section 49 is compressed onto the exposed core. Upon insertion of the end 52 of the crimp component, into the sleeve 45, through the openings 30, 31 in the plug back end body, a chamfer causes the resilient members 51 to be compressed against the front section 50 of the crimp component to allow them to pass through the constrictions 53, 54. Beyond the second constriction 54, the cross section 55 opens out again a little, releasing the pressure on the resilient members, allowing them to spring out. The body of the engagement section at its widest point, ensures that those parts 56 of the resilient members running over the widest point make contact with the electrically conducting inner wall of the lining 45. The shoulders 53, 54 forming the constructions prevent the crimp component from being easily withdrawn and the ramp formed between them may be tuned to get a desired level of resistance to removal.

Figure 10:
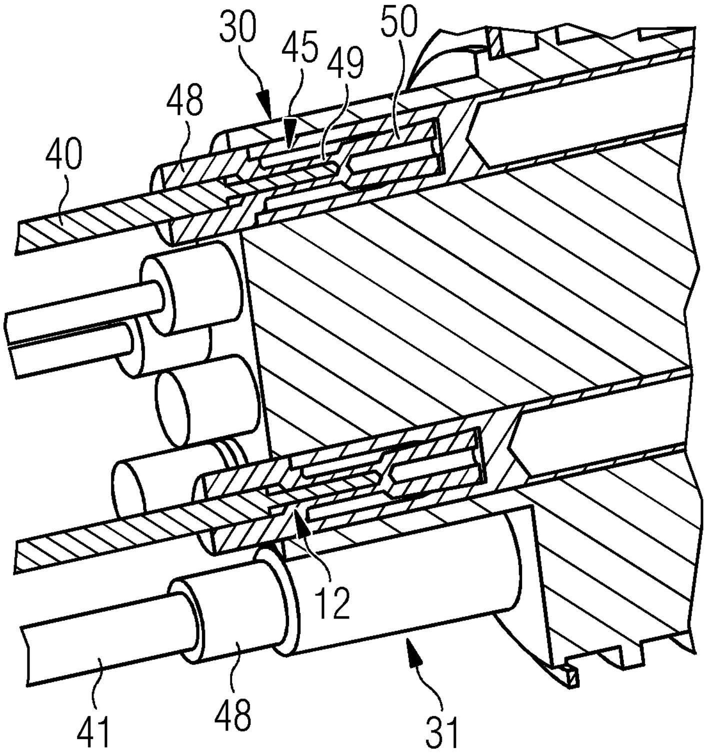

FIG. 10 is a section through a plug or receptacle back end in which a solderless termination according to the present invention may be used. The example shown is that of FIG. 9, but any of the terminations described hereinbefore may be used to hold the terminated cable in the plug or receptacle back end. The section shows detail for the thinner data cable conductors, with the wider, power cable conductors seen in perspective view. In both cases, the crimp barrel 48 can be seen, providing electrical stress management and cable strain relief. For the data cables, the crimp section 49 and engagement section 50 are also visible, within the liner 45 of the openings 30. The data cable 40 and power cable 41 have different diameters, because of the different thickness of conductor and insulation, but the external diameter of the barrel may be kept constant, irrespective of the external diameter of the cable insulation within it. In use, additionally, a boot (not shown) may be fitted over the barrel 48 and insulation to prevent water ingress.

With the design so described, a reliable electrical bridge between the receptacle pins in the front end of the plug body and the cable cores is achieved without the need for soldering or other types of fixing that add cost and complication.

A subsea connector cable termination system for terminating a cable may comprise a cable core and a cable sheath; the termination system comprising a mount, a conductive resilient member mounted radially outwardly of the cable core and of the mount; and a retainer. The mount may comprise a conductive crimp component or cylindrical sleeve. The cable core may comprise one of an electrical conductor, or a data transmission medium. The electrical conductor or data transmission medium may comprise one of a copper core, stranded wires, twisted pair wires, a waveguide, or an optical fibre. The retainer may comprise a threaded inner surface. The conductive crimp component or the cylindrical sleeve mounted to the optical fibre comprise a correspondingly threaded outer surface. The conductive resilient member may comprise a leaf spring. The retainer may further comprise an external thread. The system may further comprise a housing, wherein the housing comprises a corresponding internal thread. The threaded outer surface of the conductive crimp component or the cylindrical sleeve mounted to the optical fibre may be axially offset with respect to the external thread of the retainer.

A method of terminating a cable to a connector in a subsea cable connection system may comprise exposing a section of cable core at one end of the cable; fitting a crimp component or mount around the circumference of the cable core; crimping the crimp component to the cable core or fixing the mount to the cable core; fitting a conductive leaf spring to a groove in a first section of the crimp component remote from the cable sleeve; applying a retainer to the crimp body in a second section adjacent to the cable sleeve; and fitting a housing over the first section in contact with the retainer. The retainer may comprise an external thread and the housing comprises a corresponding internal thread.

It should be noted that the term "comprising" does not exclude other elements or steps and "a" or "an" does not exclude a plurality. Also, elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. A subsea connector cable termination system for terminating a cable comprising a cable core and a cable sheath; the termination system comprising a crimp component, the crimp component comprising a crimp body and further comprising two or more integral conductive resilient members adapted to be mounted radially outwardly of the cable core wherein the termination system further comprises a retainer, or wherein one of the crimp body, or the conductive resilient members, are adapted to latch the crimp body to a housing, wherein the retainer comprises a threaded inner surface.

2. A system according to claim 1, wherein the crimp component comprises a conductive crimp component or the sleeve comprises a cylindrical sleeve, in particular for an optical fibre.

3. A system according to claim 2, wherein the conductive crimp component, or the cylindrical sleeve mounted to an optical fibre, comprises a threaded outer surface.

4. A system according to claim 3, wherein the threaded outer surface of the conductive crimp component or the cylindrical sleeve mounted to the optical fibre are axially offset with respect to an external thread of the retainer.

5. A system according to claim 1, wherein the cable core comprises one of an electrical conductor, or a data transmission medium.

6. A system according to claim 5, wherein the electrical conductor or data transmission medium comprises one of a copper core, stranded wires, twisted pair wires, a waveguide, or an optical fibre.

7. A system according to claim 1, wherein the conductive resilient member comprises a leaf spring.

8. A subsea connector cable termination system for terminating a cable comprising a cable core and a cable sheath; the termination system comprising a crimp component, the crimp component comprising a crimp body and further comprising two or more integral conductive resilient members adapted to be mounted radially outwardly of the cable core wherein the termination system further comprises a retainer, or wherein one of the crimp body, or the conductive resilient members, are adapted to latch the crimp body to a housing, wherein the retainer further comprises an external thread.

9. A system according to at least claim 3, wherein the system further comprises the housing, wherein the housing comprises an internal thread, corresponding to the threaded outer surface.

10. A method of terminating a cable to a connector in a subsea cable connection system, the method comprising exposing a section of cable core at one end of the cable by removing a section of insulation; fitting a crimp component or sleeve around the circumference of the cable core; crimping the crimp component to the cable core or fixing the sleeve around the cable core; fitting a conductive leaf spring to a groove in a first section of the crimp component remote from a cable sleeve, or in the sleeve; applying a retainer to the crimp body in a second section adjacent to the cable sleeve, or providing a latch in the crimp body, in the sleeve, or in the conductive resilient members; and fitting a housing over the first section in contact with the retainer, or latch, wherein the retainer comprises an external thread and the housing comprises a corresponding internal thread.

* * * * *